US010830280B2

(12) United States Patent
Seki (10) Patent No.: US 10,830,280 B2
(45) Date of Patent: Nov. 10, 2020

(54) BEARING DEVICE FOR VEHICLE WHEEL (71) Applicant: NTN CORPORATION, Osaka (JP)

(72) Inventor: Makoto Seki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/497,033

(22) PCT Filed: Mar. 23, 2018

(86) PCT No.: PCT/JP2018/011903
§ 371 (c)(1),
(2) Date: Sep. 24, 2019

(87) PCT Pub. No.: WO2018/174282
PCT Pub. Date: Sep. 27, 2018

(65) Prior Publication Data
US 2020/0109745 A1 Apr. 9, 2020

(30) Foreign Application Priority Data
Mar. 24, 2017 (JP) .................................. 2017-060042

(51) Int. Cl.
*F16C 33/78* (2006.01)
*F16C 19/38* (2006.01)
*B60B 27/00* (2006.01)

(52) U.S. Cl.
CPC .......... *F16C 33/783* (2013.01); *B60B 27/001* (2013.01); *B60B 27/0073* (2013.01);
(Continued)

(58) Field of Classification Search
CPC ..................... F16C 33/7813; F16C 33/7816; F16C 33/783; F16C 33/7859; F16C 33/7866;
(Continued)

(56) References Cited

U.S. PATENT DOCUMENTS 8,702,314 B2 * 4/2014 Takimoto .............. F16C 33/783
277/353
9,989,094 B2 6/2018 Yamada
(Continued)

FOREIGN PATENT DOCUMENTS

CN 105587774 5/2016
EP 3 040 566 A1 7/2016
(Continued)

OTHER PUBLICATIONS

Translation of JP2017036769 obtained May 15, 2020.*
(Continued)

*Primary Examiner* — James Pilkington
(74) *Attorney, Agent, or Firm* — Wenderoth, Lind & Ponack, L.L.P.

(57) ABSTRACT

A bearing device for vehicle wheel includes a sealing ring (71) that includes: a core bar (72) and sealing rubber (73). The sealing rubber (73) includes: a first sealing lip (73b) that is formed to the radial-direction outside of the fitting part (72a) and has a tip end part that is in sliding contact with a sealing plane part (3h); and a second sealing lip (73c) that is formed to the radial-direction inside of the fitting part (72a) and has a tip end part that is in sliding contact with the sealing plane part (3h). A flat surface (73e) that can be contacted by a press-fitting tool (P) and by the tip end part of the fitting part (72a) of another bearing device for vehicle wheel is formed between the first sealing lip (73b) and the second sealing lip (73c).

2 Claims, 7 Drawing Sheets (52) U.S. Cl.
CPC ........ *F16C 19/386* (2013.01); *F16C 33/7859* (2013.01); *F16C 33/7886* (2013.01); *F16C 33/7813* (2013.01); *F16C 2326/02* (2013.01)

(58) Field of Classification Search
CPC . F16C 33/7886; F16C 33/805; B60B 27/0073
See application file for complete search history.

(56) References Cited

U.S. PATENT DOCUMENTS

| | | |
|---|---|---|
| 10,240,674 B2 | 3/2019 | Sakai et al. |
| 2009/0256316 A1 | 10/2009 | Kanzaki et al. |
| 2012/0007316 A1 | 1/2012 | Terasawa |
| 2012/0177315 A1* | 7/2012 | Matsuki ............... F16J 15/3456 384/478 |
| 2016/0131257 A1 | 5/2016 | Sakai et al. |
| 2017/0067509 A1 | 3/2017 | Yamada |

FOREIGN PATENT DOCUMENTS

| | | |
|---|---|---|
| EP | 3 040 566 B1 | 3/2019 |
| JP | 2007-127203 | 5/2007 |
| JP | 2010-121645 | 6/2010 |
| JP | 2010-180896 | 8/2010 |
| JP | 2010-230150 | 10/2010 |
| JP | 5573199 | 8/2014 |
| JP | 2015-042879 | 3/2015 |
| JP | 2015-172401 | 10/2015 |
| JP | 2016-089999 | 5/2016 |
| JP | 2017-036769 | 2/2017 |

OTHER PUBLICATIONS

International Search Report dated Jun. 26, 2018 in International (PCT) Application No. PCT/JP2018/011903.
First Office Action in corresponding Chinese Application No. 201880019890.7 dated Aug. 13, 2020 with English translation.

\* cited by examiner

BEARING DEVICE FOR VEHICLE WHEEL

TECHNICAL FIELD

The present invention relates to a bearing device for vehicle wheel.

BACKGROUND ART

A bearing device for vehicle wheel that supports a vehicle wheel rotatable on a suspension device of, for example, an automobile is conventionally known. The bearing device for vehicle wheel is supported by a knuckle provided on, for example, a chassis of a vehicle and supports a vehicle wheel rotatable with rolling elements that are housed in the bearing device for vehicle wheel. Such a bearing device for vehicle wheel is disposed at a position prone to be splashed with muddy water or the like and thus has a sealing member that seals a space between an outer member and an inner member.

As one form of the sealing member attached to the bearing device for vehicle wheel, a sealing member including a core bar having an annular shape and externally fitted on an outer-side end of the outer member and a sealing rubber bonded to the core bar is known. For example, such a sealing member is disclosed in Patent Literature 1 and Patent Literature 2.

In the bearing device for vehicle wheel disclosed in Patent Literature 1 or Patent Literature 2, a vehicle wheel installation flange extending radially outward is formed on the inner member. A sealing lip is formed on the sealing rubber of the sealing member, and a tip end of the sealing lip is in sliding contact with an inner-side end surface of the vehicle wheel installation flange that faces an outer-side end of the outer member.

On the other hand, to fit the sealing member disclosed in Patent Literature 1 or Patent Literature 2 on the outer member, it is required that a press-fitting tool be pressed against an outer-side flat surface of a portion where a cylindrical fitting part of the core bar is formed. In the sealing members disclosed in Patent Literature 1 and Patent Literature 2, the fitting part is formed on a radially outer side from the sealing lip to cause the flat surface to be positioned on the outer side from the sealing lip.

CITATIONS LIST

Patent Literature

Patent Literature 1: JP-B 5573199 Gazette
Patent Literature 2: JP-A 2010-180896 Gazette

SUMMARY OF INVENTION

Technical Problems

According to the technique disclosed in Patent Literature 1 or Patent Literature 2, the fitting part of the core bar is formed on the radially outer side from the sealing lip. This requires the outer-side end of the outer member to have a larger outer diameter, which inhibits an increase in degree of freedom of design of the bearing device for vehicle wheel and a reduction of weight of the bearing device for vehicle wheel. On the other hand, when the fitting part is formed on a radially inner side as compared with the conventional structure, there is a possibility that the fitting part and the sealing lip come in contact with each other when the plurality of sealing members are stacked on each other.

The present invention has been made in view of the above circumstances, and it is therefore an object of the present invention to provide a bearing device for vehicle wheel that can achieve an increase in degree of freedom of design of the bearing device for vehicle wheel and a reduction in weight of the bearing device for vehicle wheel and prevent from a fitting part and a sealing lip from coming into contact with each other when a plurality of sealing members are stacked on each other.

Solutions to Problems

A first aspect of the prevent invention relates to a bearing device for vehicle wheel including an outer member having double-row outer rolling surfaces formed on an inner periphery, an inner member including a hub wheel having a small diameter step part formed extending in an axial direction on an outer periphery and at least one inner ring press-fitted on the small diameter step part of the hub wheel, the inner member having double-row inner rolling surfaces formed on an outer periphery facing the double-row outer rolling surfaces, double-row rolling elements rollably interposed between each of the outer rolling surfaces of the outer member and a corresponding one of the inner rolling surfaces of the inner member, and a sealing member configured to seal a space between the outer member and the inner member. In such a bearing device for vehicle wheel, the sealing member includes a core bar having a cylindrical fitting part fitted on an outer peripheral surface of an outer-side end of the outer member, and a sealing rubber bonded to the core bar, the sealing rubber includes a first sealing lip extending obliquely radially outward and toward an outer side and a second sealing lip extending obliquely radially outward and toward the outer side, and a flat surface is formed between the first sealing lip and the second sealing lip, the flat surface overlapping neither the first sealing lip nor the second sealing lip in an axial direction and overlapping the fitting part of the core bar in the axial direction.

According to a second aspect of the present invention based on the bearing device for vehicle wheel according to the first aspect of the present invention, a step part protruding toward the outer side is formed on a radially outer-side portion from the flat surface and/or a radially inner-side portion from the flat surface.

According to a third aspect of the present invention based on the bearing device for vehicle wheel according to the first or second aspect of the present invention, the core bar is bent radially outward at an inner-side end of the fitting part.

Advantageous Effects of Invention

The effects of the present invention are as follows.

That is, the first aspect of the present invention eliminates the need for forming the fitting part of the core bar on the radially outer side from the sealing lip and thus eliminates the need for making the outer diameter of the outer-side end of the outer member larger, which allows an increase in degree of freedom of design of the bearing device for vehicle wheel and a reduction in weight of the bearing device for vehicle wheel. Further, the first aspect of the present invention makes it possible to prevent the fitting part and the sealing lip from coming into contact with each other when the plurality of sealing members are stacked on each other.

Further, the second aspect of the present invention makes it possible to increase stability when the plurality of sealing members are stacked on each other.

Further, the third aspect of the present invention makes it possible to increase a fitting force of the sealing member against the outer member.

BRIEF DESCRIPTION OF DRAWINGS

FIGS. 5A and 5B show cross-sectional views of the sealing members.

FIGS. 6A and 6B show enlarged cross-sectional views of sealing members.

FIG. 7 is an enlarged cross-sectional view showing a structure of a sealing member in a fourth embodiment of the bearing device for vehicle wheel according to the present invention.

DESCRIPTION OF EMBODIMENTS

First, a description will be given of a bearing device for vehicle wheel 1 corresponding to a first embodiment of a bearing device for vehicle wheel according to the present invention with reference to FIG. 1 to FIG. 5B.

Figure 1:
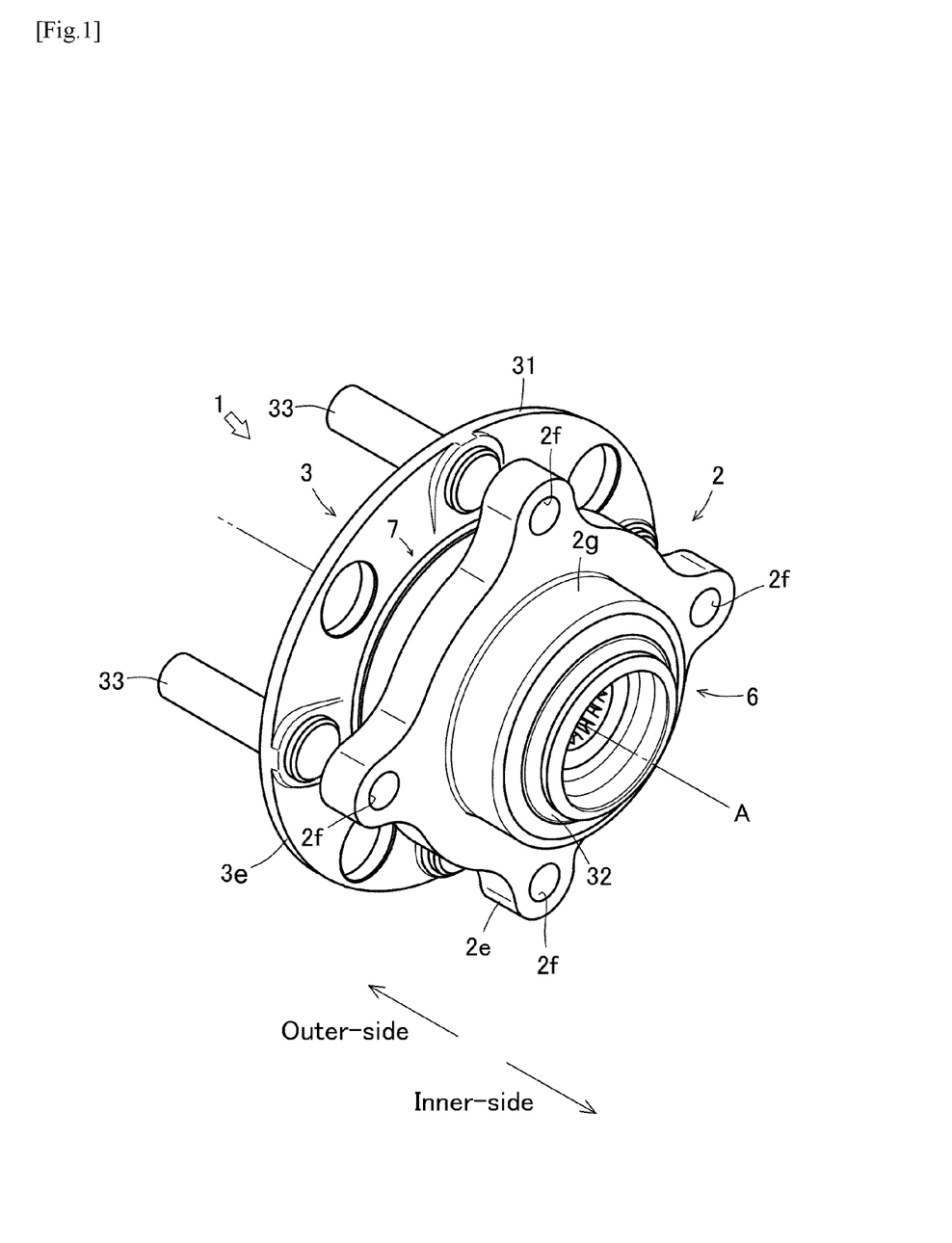
FIG. 1 is a perspective view showing an overall structure in a first embodiment of a bearing device for vehicle wheel according to the present invention.
Figure 2:
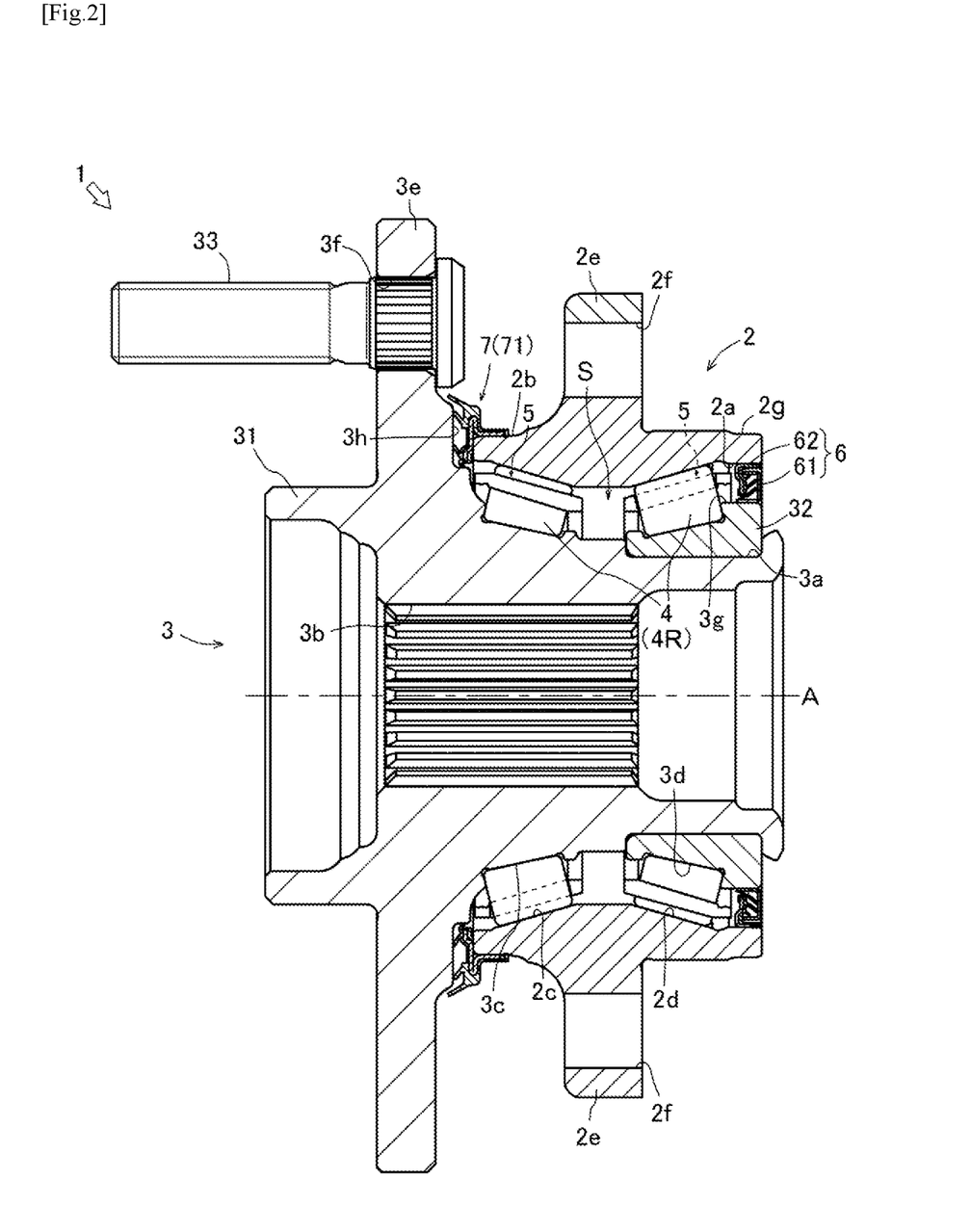
FIG. 2 is a cross-sectional view showing the overall structure in the first embodiment of the bearing device for vehicle wheel according to the present invention.

As shown in FIG. 1 and FIG. 2, the bearing device for vehicle wheel 1 supports a vehicle wheel rotatable on a suspension device of a vehicle such as an automobile. The bearing device for vehicle wheel 1 includes an outer member 2, an inner member 3, rolling elements (hereinafter, referred to as "tapered rollers") 4, a cage 5, an inner-side sealing member 6, and an outer-side sealing member 7. Note that, herein, "inner side" refers to a vehicle-body side of the bearing device for vehicle wheel 1 when installed on the vehicle body, and "outer side" refers to a vehicle wheel side of the bearing device for vehicle wheel 1 when installed on the vehicle body. Further, "radially outward" and "radially outer side" refer to a direction away from a rotation axis of the inner member 3, and "radially inward" and "radially inner side" refer to a direction approaching the rotation axis A of the inner member 3. Further, "axial direction" refers to a direction along the rotation axis A.

The outer member 2 constitutes an outer ring portion of a rolling bearing structure. A fitting surface $2a$ is formed on an inner periphery of an inner-side end of the outer member 2. A fitting surface $2b$ is formed on an outer periphery of an outer-side end of the outer member 2. Further, on an inner periphery of a middle section in the axial direction of the outer member 2, two outer rolling surfaces $2c$, $2d$ are formed. The outer rolling surface $2c$ faces an inner rolling surface $3c$ to be described later. The outer rolling surface $2d$ faces an inner rolling surface $3d$ to be described later. In addition, a vehicle body installation flange $2e$ is integrally formed on an outer periphery of the outer member 2. The vehicle body installation flange $2e$ is provided with a plurality of bolt holes $2f$.

The inner member 3 constitutes an inner ring portion of the rolling bearing structure. The inner member 3 is formed of a hub wheel 31 and an inner ring 32.

Figure 3:
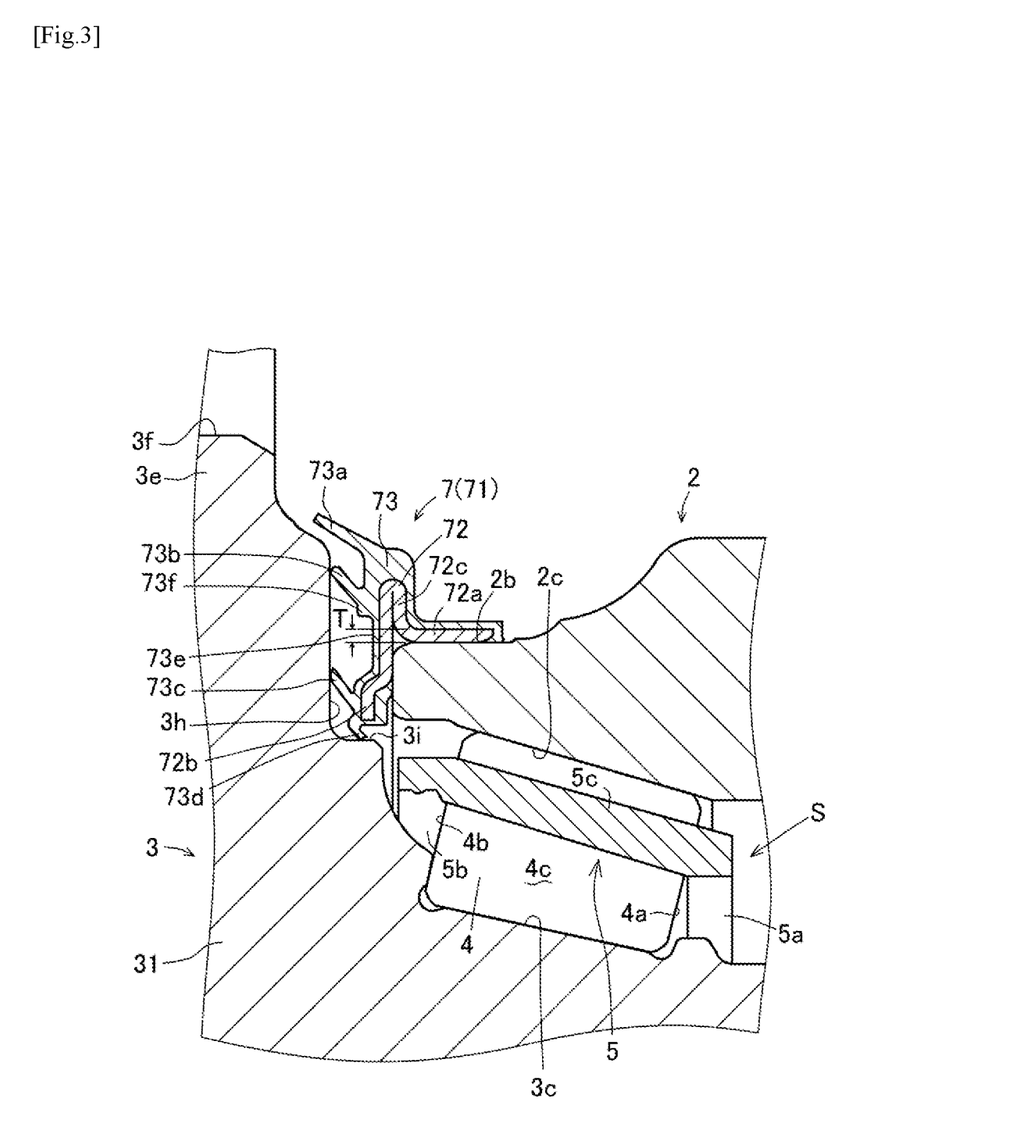
FIG. 3 is an enlarged cross-sectional view showing a structure of a sealing member in the first embodiment of the bearing device for vehicle wheel according to the present invention.

The hub wheel 31 has a small diameter step part $3a$ formed extending from an inner-side end toward the middle section in the axial direction of the hub wheel 31. The small diameter step part $3a$ corresponds to a part where an outer diameter of the hub wheel 31 is made smaller, and an outer peripheral surface of the small diameter step part $3a$ has a cylindrical shape coaxial with the rotation axis A. Further, a universal joint installation hole $3b$ is formed extending through the hub wheel 31 from the inner-side end to an outer-side end of the hub wheel 31. The universal joint installation hole $3b$ corresponds to a through hole provided through a center of the hub wheel 31, and an inner peripheral surface of the universal joint installation hole $3b$ has a concavo-convex shape (spline hole) in which a recess and a protrusion are alternately arranged. Furthermore, the inner rolling surface $3c$ is formed on the outer periphery of the hub wheel 31. The inner rolling surface $3c$ faces the outer rolling surface $2c$ described above. In addition, on an outer peripheral surface on the outer side of the hub wheel 31, a vehicle wheel installation flange $3e$ is integrally formed extending radially outward. The vehicle wheel installation flange $3e$ is provided with a plurality of bolt holes $3f$ at equal intervals concentrically around the rotation axis A, and a hub bolt 33 is press-fitted into each of the bolt holes $3f$. As shown in FIG. 3, on a base end of the vehicle wheel installation flange $3e$, an inner-side end surface is formed as a sealing flat part $3h$. Further, on an outer peripheral surface of a shaft portion extending from the sealing flat part $3h$ toward the inner side, a step part $3i$ is formed.

On an outer periphery on the inner side of the inner ring 32, a fitting surface $3g$ is formed. Further, on the outer periphery of the inner ring 32, the inner rolling surface $3d$ is formed. The inner ring 32 is press-fitted (externally fitted) on the small diameter step part $3a$ of the hub wheel 31 to form the inner rolling surface $3d$ on the outer periphery of the hub wheel 31. The inner rolling surface $3d$ faces the outer rolling surface $2d$ described above. The inner ring 32 is fixed to the inner-side end of the hub wheel 31 by press fitting. That is, on the inner side of the hub wheel 31, the inner rolling surface $3d$ is formed by the inner ring 32. As described above, in the inner member 3, the inner rolling surface $3d$ of the inner ring 32 at the inner-side end faces the outer rolling surface $2d$ on the inner side of the outer member 2, and the inner rolling surface $3c$ on the outer side of the hub wheel 31 faces the outer rolling surface $2c$ on the outer side of the outer member 2.

The tapered rollers 4 that are rolling elements constitute a rolling portion of the rolling bearing structure. Tapered rollers 4 constituting a tapered roller row 4R are arranged in a circle at equal intervals by the cage 5 to be described later.

These tapered rollers 4 are rollably interposed between each of the outer rolling surfaces 2c, 2d of the outer member 2 and a corresponding one of the inner rolling surfaces 3c, 3d of the inner member 3 (the hub wheel 31 and the inner ring 32). As described above, the bearing device for vehicle wheel 1 according to the present embodiment is formed as a double-row tapered roller bearing, but the bearing device for vehicle wheel 1 is not limited to this structure and may be formed as, for example, a double-row angular contact ball bearing.

The cage 5 restricts deflection of the tapered rollers 4. As shown in FIG. 3, the cage 5 has a tapered grid body formed of a small diameter annular part 5a, a large diameter annular part 5b, and a plurality of column parts 5c that connect the small diameter annular part 5a and the large diameter annular part 5b. The small diameter annular part 5a extends along a small diameter end surface 4a of each of the tapered rollers 4, which restricts deflection of the tapered rollers 4 to one side in the axial direction. Further, the large diameter annular part 5b extends along a large diameter end surface 4b of each of the tapered rollers 4, which restricts deflection of the tapered rollers 4 to the other side in the axial direction. The column parts 5c each extend between tapered rollers 4 adjacent to each other and along outer peripheral surfaces 4c of these tapered rollers 4, which restricts deflection of the tapered rollers 4 in a circumferential direction.

The inner-side sealing member 6 seals an inner-side opening end of an annular space S formed between the outer member 2 and the inner member 3. The inner-side sealing member 6 includes a slinger 61 and a sealing ring 62.

The slinger 61 is fitted (externally fitted) on the fitting surface 3g of the inner ring 32. The slinger 61 is bent such that its cross section in the axial direction has an approximately L shape.

The sealing ring 62 is fitted (internally fitted) on the fitting surface 2a of the outer member 2. The sealing ring 62 is formed of a core bar and a sealing rubber. The core bar is bent such that its cross section in the axial direction has an approximately L shape. The sealing rubber that is an elastic body is bonded by vulcanization to the core bar.

A sealing lip formed on the sealing rubber comes into contact with the slinger 61, which causes the inner-side sealing member 6 to prevent muddy water or dust from entering the annular space S and also prevent grease from leaking out of the annular space S.

The outer-side sealing member 7 seals an outer opening end of the annular space S formed between the outer member 2 and the inner member 3. The outer-side sealing member 7 is formed of a sealing ring 71.

The sealing ring 71 is fitted (externally fitted) on the fitting surface 2b of the outer member 2. The sealing ring 71 is formed of a core bar 72 and a sealing rubber 73. The core bar 72 is made of a stainless steel sheet such as SUS430 or SUS304, or a cold-rolled steel sheet such as SPCC. The core bar 72 is formed of an annular steel sheet that is bent by press working such that its cross section in the axial direction is folded back to have an approximately T shape. Specifically, the core bar 72 has a cylindrical fitting part 72a fitted on the fitting surface 2b, a bent part 72c bent radially outward from an outer-side end of the fitting part 72a, a disk-shaped side plate part 72b folded back radially inward from the bent part 72c and extending toward the rotation axis A of the hub wheel 31. The sealing rubber 73 that an elastic body is bonded to the core bar 72.

The sealing rubber 73 is made of a synthetic rubber such as an acrylonitrile-butadiene rubber (NBR), a hydrogenated acrylonitrile butadiene rubber (HNBR), an ethylene propylene rubber (EPDM), a polyacrylic rubber (ACM), a fluoro-rubber (FKM), or a silicone rubber. A first sealing lip 73b and a second sealing lip 73c formed on the sealing rubber 73 extend obliquely radially outward and toward the outer side and have their respective tip portions in sliding contact with the sealing flat part 3h of the vehicle wheel installation flange 3e. Further, a third sealing lip 73d formed on the sealing rubber 73 has a tip portion in sliding contact with the step part 3i at the base end of the vehicle wheel installation flange 3e.

On a radially outer-side end of the sealing rubber 73, a cylindrical shielding part 73a extending toward the vehicle wheel installation flange 3e is formed. The shielding part 73a shields a gap between the vehicle wheel installation flange 3e and the outer-side end of the outer member 2. Accordingly, the outer-side sealing member 7 causes the shielding part 73a and the first sealing lip 73b to the third sealing lip 73d to prevent muddy water or dust from entering the annular space S and also prevent grease from leaking out of the annular space S.

As described above, in the bearing device for vehicle wheel 1 according to the present embodiment, the first sealing lip 73b and the second sealing lip 73c in sliding contact with the sealing flat part 3h are formed on the sealing rubber 73. As shown in FIG. 3, the first sealing lip 73b is formed on a radially outer side from the fitting part 72a of the core bar 72. Further, the second sealing lip 73c is formed on a radially inner side from the fitting part 72a of the core bar 72. Specifically, the first sealing lip 73b and the second sealing lip 73c are arranged such that their respective base ends and tip ends do not overlap a radial width T in which the fitting part 72a is formed.

According to the present embodiment, a flat surface 73e against which a press-fitting tool P (see FIG. 4) is pressed is formed between the first sealing lip 73b and the second sealing lip 73c. The flat surface 73e is a flat portion of a surface on the outer side of the sealing rubber 73 that includes the radial width T in which the fitting part 72a is formed. As indicated by an arrow F shown in FIG. 4, the press-fitting tool P is pressed against the flat surface 73e to apply a pressing force to the sealing ring 71, thereby fitting the sealing ring 71 on the fitting surface 2b of the outer member 2. According to the present embodiment, as shown in FIG. 5B, in order to perform stable press-fitting with the press-fitting tool P having a sufficiently large size, the flat surface 73e is formed with a radial width W equal to or greater than 1.35 mm.

As described above, according to the present embodiment, in the sealing ring 71, the fitting part 72a of the core bar 72 is formed between the first sealing lip 73b and the second sealing lip 73c in the radial direction, thereby allowing the flat surface 73e to be formed between the first sealing lip 73b and the second sealing lip 73c. Accordingly, the fitting surface 2b of the outer member 2 can be disposed on the radially inner side from the base end of the first sealing lip 73b, and an outer diameter of the fitting surface 2b can be made smaller, which in turn makes it possible to increase the degree of freedom of design of the bearing device for vehicle wheel 1. Further, the reduction in diameter of the outer-side end (fitting surface 2b) of the outer member 2 makes it possible to reduce the weight of the outer member 2 and the weight of the bearing device for vehicle wheel 1.

Figure 5A:
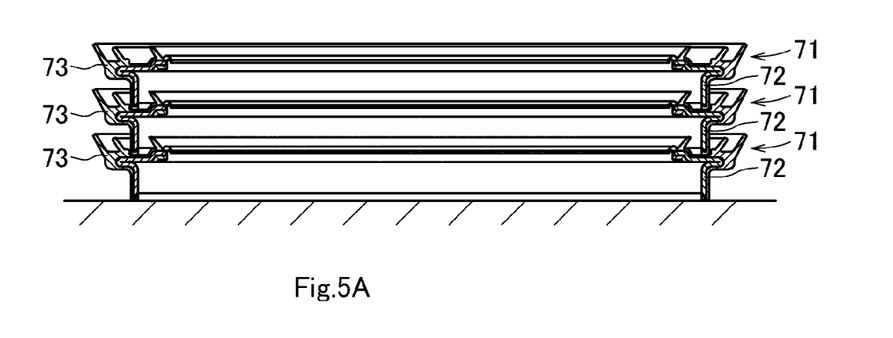
FIG. 5A is a cross-sectional view showing a state where the sealing members are stacked on each other in the first embodiment of the sealing member according to the present invention.
Figure 5B:
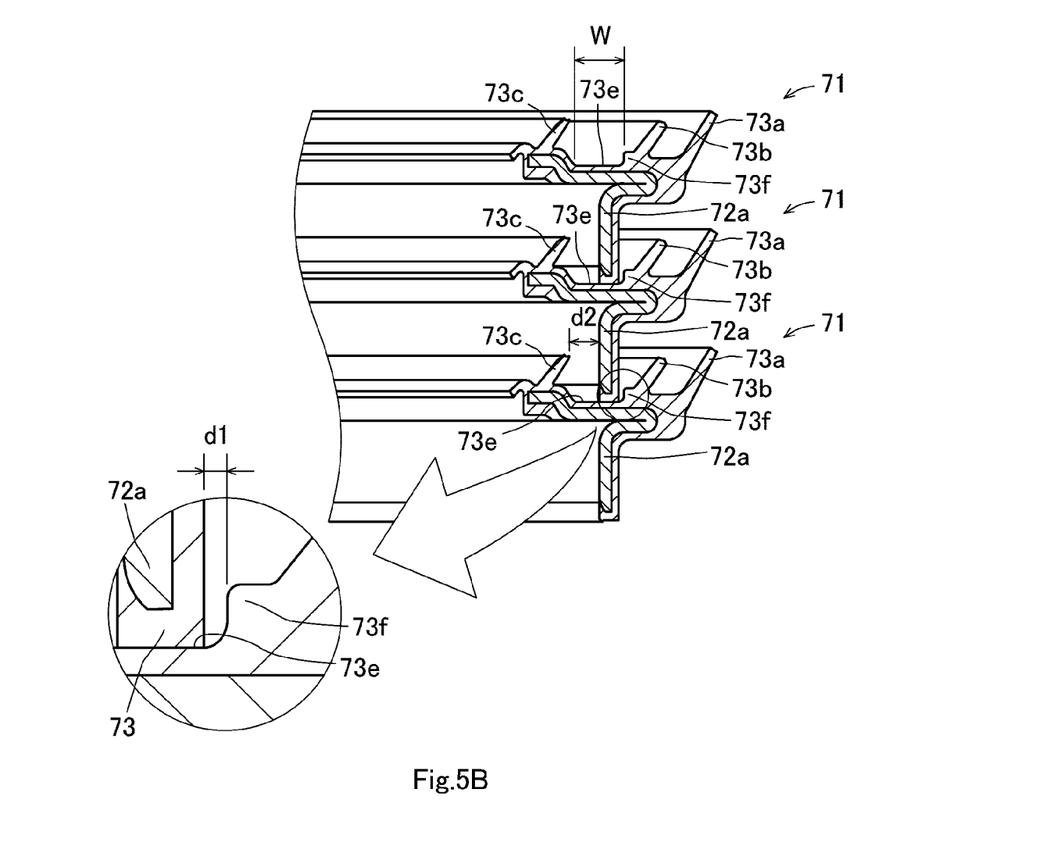
FIG. 5B is a partially enlarged cross-sectional view also showing the state where the sealing members are stacked on each other.

Further, according to the present embodiment, as shown in FIG. 5A and FIG. 5B, when a plurality of the sealing rings 71 are stacked on each other, the fitting part 72a of an upper sealing ring 71 and the flat surface 73e of a lower sealing ring 71 are aligned with each other in the radial direction. This makes it possible to prevent the fitting part 72a of the upper sealing ring 71 from coming into contact with the first sealing lip 73b and second sealing lip 73c of the lower sealing ring 71. According to the present embodiment, as shown in FIG. 5B, a distance d2 between the second sealing lip 73c of the lower sealing ring 71 and the fitting part 72a of the upper sealing ring 71 is equal to or greater than 0.5 mm.

Further, grease is applied in advance to the first sealing lip 73b and the second sealing lip 73c, the grease being necessary for the first sealing lip 73b and the second sealing lip 73c to slide on the sealing flat part 3h of the vehicle wheel installation flange 3e when the outer member 2 and the inner member 3 rotate relative to each other. As described above, the present embodiment makes it possible to prevent the fitting part 72a of the upper sealing ring 71 from coming into contact with the first sealing lip 73b and second sealing lip 73c of the lower sealing ring 71, which in turn makes it possible to prevent the grease applied to the first sealing lip 73b and the second sealing lip 73c from adhering to the fitting part 72a and decreasing.

Figure 4:
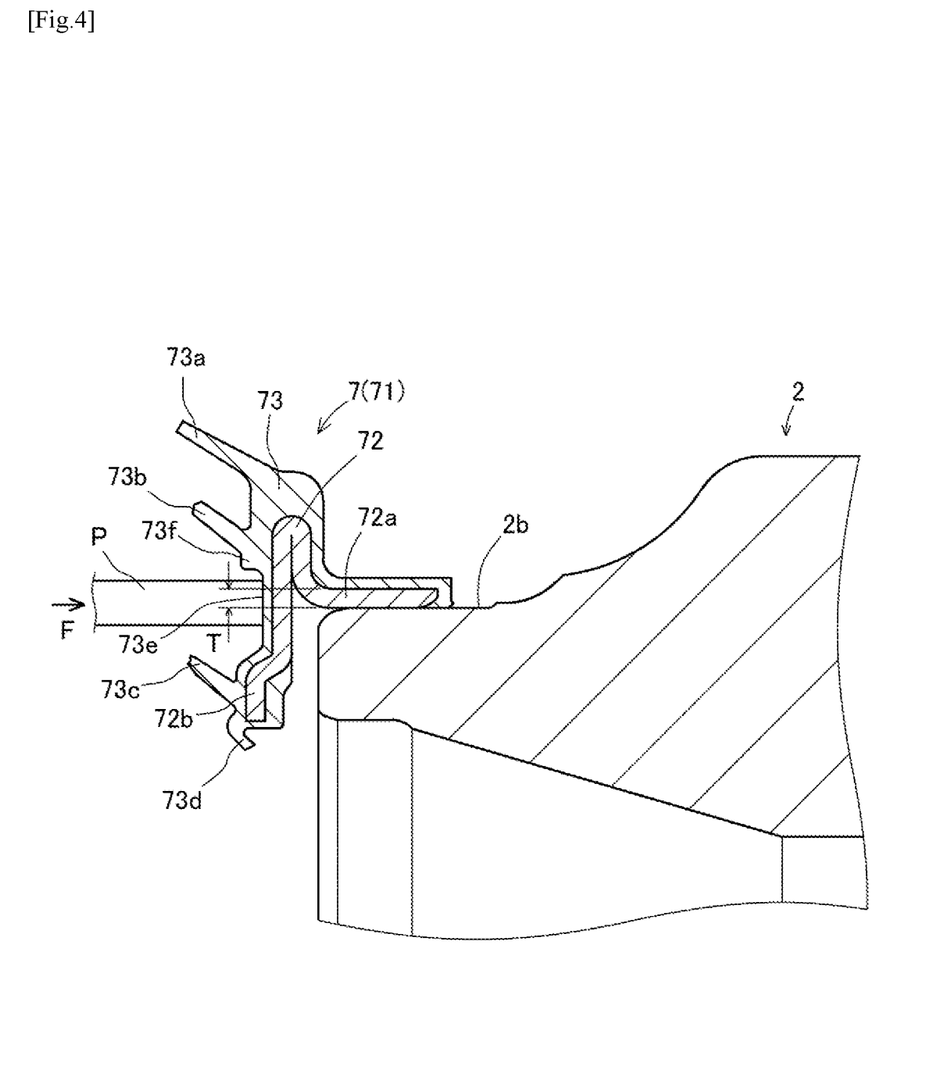
FIG. 4 is an enlarged cross-sectional view showing a state where the sealing member has been press-fitted in the first embodiment of the bearing device for vehicle wheel according to the present invention.

Further, according to the present embodiment, as shown in FIG. 4 and FIG. 5B, a step part 73f protruding toward the outer side is formed on a radially outer-side portion from the flat surface 73e. This allows, as shown in FIG. 5A and FIG. 5B, the tip end of the upper sealing ring 71 to be positioned along the step part 73f of the lower sealing ring 71 when the plurality of sealing rings 71 are stacked on each other, which makes the sealing rings 71 less susceptible to misalignment. That is, this makes it possible to increase stability of the sealing rings 71 stacked on each other.

Further, according to the present embodiment, as shown in the enlarged view in FIG. 5B, in order to increase positional accuracy when the plurality of sealing rings 71 are stacked on each other, a gap d1 in the radial direction between the step part 73f of the lower sealing ring 71 and the tip end of the upper sealing ring 71 (a portion where the upper sealing ring 71 comes into contact with the flat surface 73e of the lower sealing ring 71) is made equal to or less than 1.0 mm.

Note that the step part adjacent to the flat surface may be a form where a step is formed with respect to the flat surface like the step part 73f of the first embodiment, or may be a form where a step is formed annularly protruding from the flat surface.

Next, a description will be given of an outer-side sealing member corresponding to a second embodiment of the sealing member according to the present invention with reference to FIG. 6A. The outer-side sealing member according to the present embodiment is formed of a sealing ring 171. Note that, in the following description to be given of the outer-side sealing member according to the embodiment, the names, figure numbers, and reference numerals used in the description given of the sealing ring 71 shown in FIG. 1 to FIG. 5B are used to denote the same components. That is, in the following embodiment, no detailed description will be given of the same points as the points of the embodiment already described, and a description will be mainly given of different points.

Figure 6A:
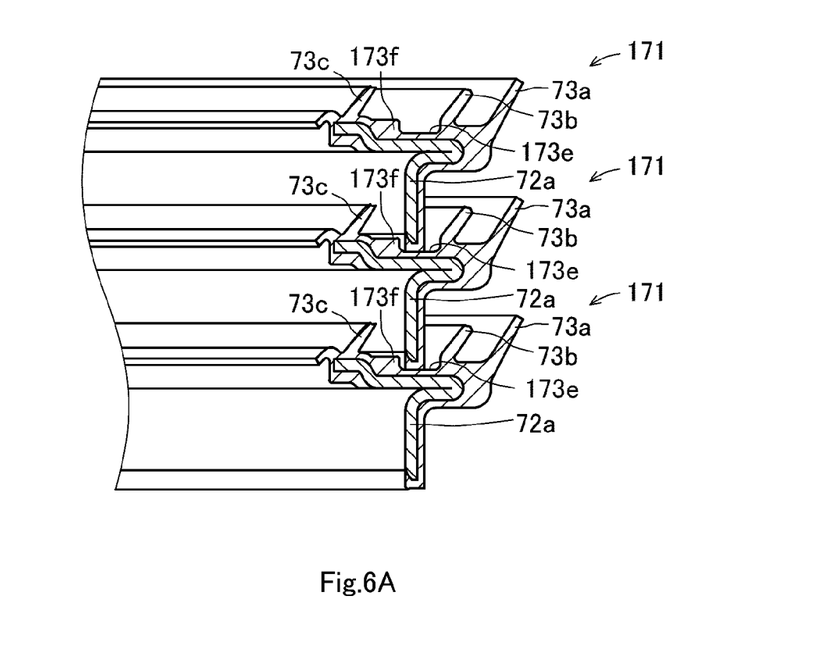
FIG. 6A is a partially enlarged cross-sectional view showing a state where the sealing members are stacked on each other in a second embodiment of the sealing member.

In the sealing ring 171 according to the present embodiment, as shown in FIG. 6A, a flat surface 173e against which the press-fitting tool P is pressed is formed between the first sealing lip 73b and the second sealing lip 73c. A step part 173f protruding toward the outer side is formed on a radially inner-side portion from the flat surface 173e. This allows, as shown in FIG. 6A, the tip end of an upper sealing ring 171 to be positioned along the step part 173f of a lower sealing ring 171 when the plurality of sealing rings 171 are stacked on each other, which makes the sealing rings 171 less susceptible to misalignment. That is, this makes it possible to increase stability of the sealing rings 171 stacked on each other.

Next, a description will be given of an outer-side sealing member corresponding to a third embodiment of the sealing member according to the present invention with reference to FIG. 6B. The outer-side sealing member according to the present embodiment is formed of a sealing ring 271.

Figure 6B:
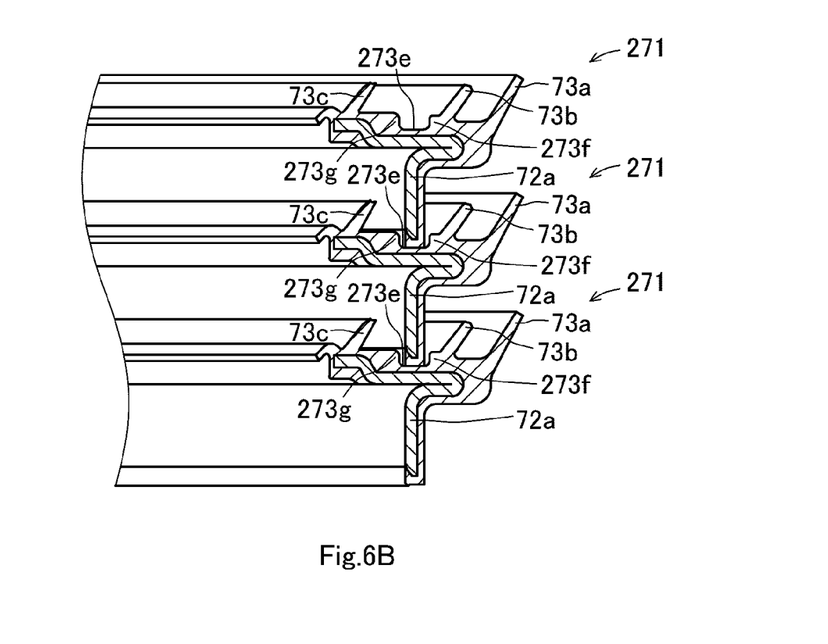
FIG. 6B is a partially enlarged cross-sectional view showing a state where the sealing members are stacked on each other in a third embodiment of the sealing member.

In the sealing ring 271 according to the present embodiment, as shown in FIG. 6B, a flat surface 273e against which the press-fitting tool P is pressed is formed between the first sealing lip 73b and the second sealing lip 73c. An outer step part 273f protruding toward the outer side is formed on a radially outer-side portion from the flat surface 273e. Furthermore, an inner step part 273g protruding toward the outer side is formed on a radially inner-side portion from the flat surface 273e. This allows, as shown in FIG. 6B, the tip end of an upper sealing ring 271 to be positioned along the outer step part 273f and inner step part 273g of a lower sealing ring 271 when the plurality of sealing rings 271 are stacked on each other, which makes the sealing rings 271 less susceptible to misalignment. That is, this makes it possible to increase stability of the sealing rings 271 stacked on each other.

As described above, the step part adjacent to the flat surface may be formed on the radially outer side of the flat surface like the step part 73f of the first embodiment, may be formed on the radially inner side of the flat surface like the step part 173f of the second embodiment, or may be formed on both radial sides of the flat surface like the outer step part 273f and inner step part 273g of the third embodiment. In any form, the step part can be formed annually protruding from the flat surface. Further, three or more sealing lips in sliding contact with the sealing flat part may be formed on the sealing rubber of the sealing ring.

Next, a description will be given of an outer-side sealing member corresponding to a fourth embodiment of the sealing member according to the present invention with reference to FIG. 7. The outer-side sealing member according to the present embodiment is formed of a sealing ring 371.

The sealing ring 371 according to the present embodiment is formed of the core bar 72 and the sealing rubber 73. The core bar 72 is formed of an annular steel sheet that is bent by press working such that its cross section in the axial direction is folded back to have an approximately T shape. Specifically, the core bar 72 has a cylindrical fitting part 72a fitted on the fitting surface 2b, a bent part 72c bent radially outward from an outer-side end of the fitting part 72a, a disk-shaped side plate part 72b folded back radially inward from the bent part 72c and extending toward the rotation axis A of the hub wheel 31. Furthermore, according to the present embodiment, in the core bar 72, an inner-side end 372d of the fitting part 72a is bent radially outward.

According to the present embodiment, the above-described structure makes it possible to increase annular rigidity of the sealing ring 371. This makes the sealing ring 371 less likely to come off from the fitting surface 2b even when a force is applied to the sealing ring 371 in a pulling direction (toward the outer side). That is, this makes it possible to increase a fitting force of the sealing ring 371 against the outer member 2. This further allows the sealing ring 371 to be shortened in the axial direction, so that the sealing ring 371 can be assembled to the outer member 2 even when an axial space on the fitting surface 2b cannot be secured in the outer member 2. Further, cutting and grinding lengths of the fitting surface 2*b* on which the sealing ring 371 is fitted can be reduced, which makes it possible to reduce the cost.

Although the descriptions have been given above of the embodiments of the present invention, the present invention is not limited to the embodiments at all, and the embodiments are merely examples. It is needless to say that various other embodiments can be made without departing from the scope of the present invention, and the scope of the present invention is set forth in the claims and further contains meaning of equivalents set forth in the claims and all modifications within the scope.

INDUSTRIAL APPLICABILITY

The present invention is applicable to a bearing device for vehicle wheel.

The invention claimed is:

1. A bearing device for a vehicle wheel comprising:
an outer member having double-row outer rolling surfaces formed on an inner periphery;
an inner member including a hub wheel having a step part formed extending in an axial direction on an outer periphery and at least one inner ring press-fitted on the step part of the hub wheel, the inner member having double-row inner rolling surfaces formed on an outer periphery facing the double-row outer rolling surfaces;
double-row rolling elements rollably interposed between respective races of the outer member and the inner member; and
a sealing member configured to seal a space between the outer member and the inner member, wherein
the sealing member includes
a core bar having a cylindrical fitting part fitted on an outer peripheral surface of an outer-side end of the outer member, the outer-side end being an end of the outer member in a direction towards a vehicle wheel installation flange of the inner member, and
a sealing rubber bonded to the core bar,
the sealing rubber includes a first sealing lip extending obliquely radially outward and toward an outer side and a second sealing lip extending obliquely radially outward and toward the outer side, the outer side being a side in the direction towards the vehicle wheel installation flange,
a flat surface is formed between the first sealing lip and the second sealing lip, the flat surface overlapping neither the first sealing lip nor the second sealing lip in an axial direction and overlapping the fitting part of the core bar in the axial direction,
and wherein the sealing rubber includes a step part protruding toward the outer side, the step part being arranged at one or both of
a position which is radially outward of the flat surface and radially inward of the first sealing lip, and
a position which is radially inward of the flat surface and radially outward of the second sealing lip.

2. The bearing device for the vehicle wheel according to claim 1, wherein the core bar is bent radially outward at an inner-side end of the fitting part, the inner-side end being an end of the fitting part in a direction opposite to the direction towards the vehicle wheel installation flange.

\* \* \* \* \*